3,551,334
Patented Dec. 29, 1970

3,551,334
BACTERIOCIDAL TREATMENT OF LIQUIDS
Joseph B. Michaelson, North Hollywood, Calif., assignor to Applied Biological Sciences Laboratory, Inc., Glendale, Calif., a corporation of California
No Drawing. Filed Aug. 9, 1967, Ser. No. 659,320
Int. Cl. A01n *9/20;* E21b *43/22*
U.S. Cl. 252—8.55                        4 Claims

ABSTRACT OF THE DISCLOSURE

A new compound, coco dimethyl benzyl ammonium p-nitrosophenate is disclosed. Useful as a bacteriocide, especially against Desulfovibrio desulfuricans, the compound may be mixed with fresh or saline water to be used for secondary oil recovery operations to prevent biosynthetic generation of hydrogen sulfide during such operations.

BACKGROUND OF THE INVENTION

(1) Field of the invention

The invention is concerned with bacteriocides and more specifically with chemical agents fatal to Desulfovibrio desulfuricans, a microbe known to biosynthetically produce noisome hydrogen sulfide in secondary oil recovery operations. Accordingly the invention is further concerned with the use of the novel bacteriocidal compound in such oil recovery operations.

(2) Prior art

To the best of my knowledge the presently disclosed compound has not been previously known.

Bacteriocides have previously been added to solutions for oil recovery operations with varying degrees of success, but the presently disclosed compound, being new, is not believed to have been so used.

SUMMARY OF THE INVENTION

I have discovered a bacteriocide, coco dimethyl benzyl ammonium p-nitrosophenate, which is specifically fatal to Desulfovibrio desulfuricans, a pseudomonad, and a biosynthesizer of hydrogen sulfide in secondary oil recovery solutions. Accordingly I have further discovered a composition for secondary recovery of oil from wells which includes an aqueous mixture, in fresh or salt water, of coco dimethyl benzyl ammonium p-nitrosophenate and a method for such recovery which includes introducing the fresh or salt water into a well following normal pumping recovery of oil therefrom, mixing the water with residual crude oil in the well and withdrawing the mixture from the well for separation of oil values therefrom, and during pumping and separating, limiting generation of hydrogen sulfide in the mixture by the presence therein of an effective amount of coco dimethyl benzyl ammonium p-nitrosophenate.

The p-nitroso portion of the compound is believed to be reduced by hydrogen sulfide present in the recovered oil-water mixture and critical to survival of the Desulfovibrio desulfuricans. This nutritive depletion of the bacteria environment coupled with a nucleic acid metabolism disruption in the bacteria also produced by the p-nitroso radical and the bacteriocidal effect of the quaternary ammonium combine to limit or obviate hydrogen sulfide fumes from the mixture.

The above-named compound may be structural depicted

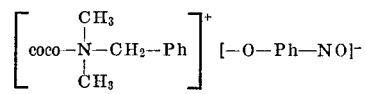

in which Ph is a phenyl radical and coco is a long chain fatty acid containing predominantly $C_{12}$ and $C_{14}$ radicals, and the nitroso, —NO radical, is para to the oxygen, —O—, radical. This compound may be prepared as follows:

EXAMPLE 1

Sodium metal (2.3 parts) was dissolved in methyl alcohol (100 parts). To the resulting sodium methylate solution there was added 9.4 parts phenol. Following solution of the phenol 326 parts of coco dimethyl benzyl ammonium chloride was added. The mixture was stirred briefly and heated to 50° C. for 15 minutes. Sodium chloride was filtered off after cooling the mixture to 25° C. There remained an alcohol solution of coco dimethyl benzyl ammonium phenate. This solution was saturated with nitrus oxide (NO) gas and let stand for 24 hours at 25° C. A waxy solid, coco dimethyl benzyl ammonium p-nitrosophenate may be separated from the solution by evaporation of the alcohol therefrom.

The herein disclosed compound is useful as bacteriocide in aqueous oil suspensions such as those encountered in secondary oil recovery operations.

EXAMPLE 2

An aqueous suspension of crude oil is innoculated with Desulfovibrio desulfuricans and divided into two parts. A first part (Example 2) is treated with the compound prepared in Example 1 at a concentration of 10 parts per million parts by weight of water. No odor of hydrogen sulfide was apparent after 12 hours.

The second part (Control I) was not treated but let stand for 12 hours. The odor of hydrogen sulfide was quite apparent above the suspension.

The proportions of coco dimethyl benzyl ammonium p-nitrosophenate employed is not narrowly critical. In general, the amount used will be an effective amount, i.e. an amount sufficient to limit hydrogen sulfide biosynthesis, such as the amount required to destroy substantially all Desulfovibrio desulfuricans in the treated water-oil mixture. As a guide, as little as 0.5 part per million parts by weight of water is effective in many cases. Where bacteria count is more than minimal, from 1 to 25 parts per million may be a minimum. Beyond about 500 or 1000 parts per million increased effectiveness is not generally commensurate with the increased cost.

EXAMPLE 3

A composition comprising salt water (3–20% by weight NaCl) and coco dimethyl benzyl ammonium p-nitrosophenate was injected into oil wells following pumping extraction of most of the oil therefrom. Concentrations of the bacteriocide are varied from 0.5 to 1000 parts per million parts of the oil-water mixture resulting from the injections. Samples of the mixtures are taken on pumping from the well. Between 50 and 500 parts per million of the bacteriocide is most effective in inhibiting hydrogen sulfide biosynthesis with lesser amounts, especially below 10 parts per million having reduced but

I claim:

1. In the method of recovering residual crude oil from wells which includes introducing water in the well to form a mixture with residual oil therein for pumping from the well and separating, the step of limiting generation of hydrogen sulfide in said mixture during pumping and separating by maintaining dispersed in said mixture an effective amount of coco dimethyl benzyl ammonium p-nitrosophenate sufficient to destroy Desulfovibrio desulfuricans organisms present in said mixture.

2. Method according to claim 1 which includes maintaining said coco dimethyl benzyl ammonium p-nitrosophenate in said mixture in an amount between 0.5 and 1000 parts per million parts of water by weight.

3. Composition useful for secondary recovery of crude oil from wells consisting essentially of water and a small but effective amount of coco dimethyl benzyl ammoninm p-nitosophenate sufficient to destroy Desulfovibrio desulfuricans organisms present to prevent biosynthesis of hydrogen sulfide in said composition.

4. Composition according to claim 3 in which said water contains 3 to 20% by weight sodium chloride.

References Cited

UNITED STATES PATENTS

| | | | |
|---|---|---|---|
| 2,395,989 | 3/1946 | Bock et al. | 260—567.5X |
| 2,692,231 | 10/1954 | Stayner et al. | 252—8.55X |
| 3,199,591 | 8/1965 | Kepley | 252—8.55X |
| 3,351,652 | 11/1967 | Wakeman et al. | 260—567.5X |

HERBERT B. GUYNN, Primary Examiner

U.S. Cl. X.R.

166—265; 260—567.5; 424—167, 329